United States Patent
Otazu Aldana

(10) Patent No.: US 12,453,757 B2
(45) Date of Patent: Oct. 28, 2025

(54) METHOD FOR AMELIORATING AUTISM SYMPTOMS BY PHARMACOLOGICAL ACTIVATION OF THE NEUROTENSIN RECEPTOR 1 (NTSR1)

(71) Applicant: New York Institute of Technology, Old Westbury, NY (US)

(72) Inventor: Gonzalo Hugo Otazu Aldana, Queens, NY (US)

(73) Assignee: New York Institute of Technology, Old Westbury, NY (US)

( * ) Notice: Subject to any disclaimer, the term of this patent is extended or adjusted under 35 U.S.C. 154(b) by 265 days.

(21) Appl. No.: 18/386,081

(22) Filed: Nov. 1, 2023

(65) Prior Publication Data

US 2024/0181012 A1 Jun. 6, 2024

Related U.S. Application Data

(60) Provisional application No. 63/540,721, filed on Sep. 27, 2023, provisional application No. 63/468,845, filed on May 25, 2023, provisional application No. 63/428,230, filed on Nov. 28, 2022.

(51) Int. Cl.
*A61K 38/22* (2006.01)
*A61K 47/10* (2017.01)
*A61P 25/00* (2006.01)

(52) U.S. Cl.
CPC .............. *A61K 38/22* (2013.01); *A61K 47/10* (2013.01); *A61P 25/00* (2018.01)

(58) Field of Classification Search
CPC ........ A61K 38/22; A61K 47/10; A61K 9/127; A61K 9/0019; A61P 25/00
See application file for complete search history.

(56) References Cited

U.S. PATENT DOCUMENTS 5,407,916 A * 4/1995 Wise ................. C07K 7/083
514/17.5
2018/0362582 A1* 12/2018 Marsault ............... A61P 29/00

FOREIGN PATENT DOCUMENTS

WO WO-2004053093 A2 * 6/2004 ......... A61K 49/0008
WO WO-2010015260 A2 * 2/2010 ............ A61K 31/22

OTHER PUBLICATIONS

Hendriksen et al.; "Mast cells in neuroinflammation and brain disorders."; Neuroscience and Biobehavioural Reviews; 79 (2017); pp. 119-133; published May 10, 2017.*

* cited by examiner

*Primary Examiner* — Jeffrey T. Palenik
(74) *Attorney, Agent, or Firm* — Amster, Rothstein & Ebenstein LLP

(57) ABSTRACT

Methods and formulations for treating autism with neurotensin R1 agonists without causing significant lethargy in a subject.

14 Claims, 5 Drawing Sheets
Specification includes a Sequence Listing.

METHOD FOR AMELIORATING AUTISM SYMPTOMS BY PHARMACOLOGICAL ACTIVATION OF THE NEUROTENSIN RECEPTOR 1 (NTSR1)

CROSS-REFERENCE TO RELATED APPLICATIONS

This application claims benefit of U.S. Provisional Application No. 63/428,230, filed Nov. 28, 2022, U.S. Provisional Application No. 63/468,845, filed May 25, 2023, and U.S. Provisional Application No. 63/540,721, filed Sep. 27, 2023, the contents of each of which are hereby incorporated by reference.

SEQUENCE LISTING

This application incorporates-by-reference amino acid sequences which are present in the file named "2238-82137-A-PCT.xml", which is 3,220 bytes in size, and which was created on Jan. 3, 2024 in the IBM-PC machine format, having an operating system compatibility with MS-Windows.

BACKGROUND OF THE INVENTION

The disclosures of all publications, patents, patent application publications and books referred to in this application are hereby incorporated by reference in their entirety into the subject application to more fully describe the art to which the subject invention pertains.

Autism presents with a "need for sameness" and novel stimuli can produce exaggerated reactions in autistic subjects. Although the prevalence of autism is high (1 in 44 children), there are only two drugs FDA-approved for treatment of autism. These drugs, risperidone and aripiprazole, only reduce irritability in autistic subjects. However, they cause severe side effects, including drowsiness and weight gain, and do not treat core symptoms of autism. Additionally, there are no current pharmacological treatments for the sensory issues in autism.

The present disclosure provides NTSR1 receptor agonists to treat sensory deficits in autism.

SUMMARY OF THE INVENTION

A formulation is provided of a neurotensin R1 agonist for treating a symptom of an autism spectrum disorder without causing lethargy in a subject, comprising:
a) an amount of a neurotensin R1 agonist effective to treat a symptom of an autism; and b) an amount of a polyethylene glycol polymer.

A product is provided comprising a sub-cutaneous injector and the formulation described herein as a liquid formulation.

A method is provided of treating a symptom of an autism spectrum disorder in a subject comprising administering to the subject an amount of a neurotensin R1 agonist effective to treat a symptom of an autism spectrum disorder.

DETAILED DESCRIPTION OF THE INVENTION

Figure 1:
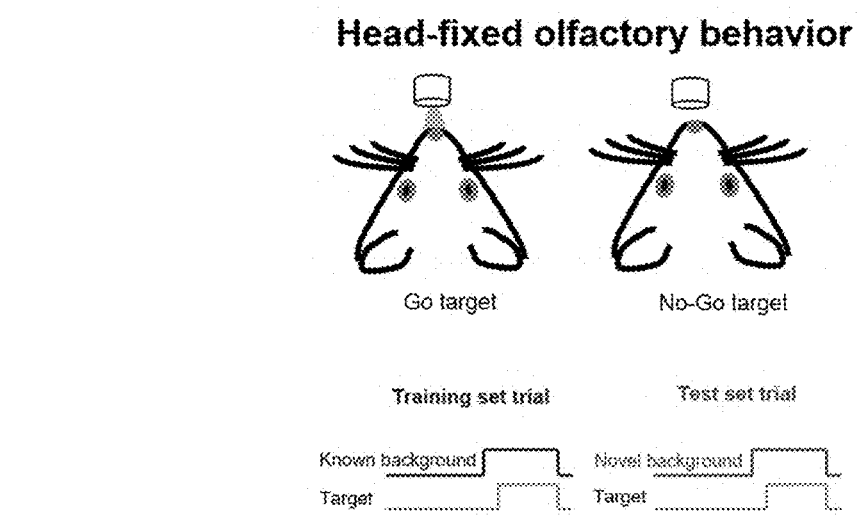
FIG. 1: Behavioral task used to test the effect of PD149163. Water-deprived, head-fixed mice were trained to identify target odors in the presence of background odors. The mouse had a waterspout available. If the target was the "go target" odors and the mouse licked, the mouse was rewarded with a small amount water. If the mouse wrongly licked the "no-go target" odors, no water was delivered and it was given a time out. After 10-13 days, mice performance exceeded 80%. The mice were then tested with the test set, that consisted of the same target odors but with novel background odors.

A formulation is provided of a neurotensin R1 agonist for treating a symptom of an autism spectrum disorder without causing lethargy in a subject, comprising:
a) an amount of a neurotensin R1 agonist effective to treat a symptom of an autism; and b) an amount of a polyethylene glycol polymer (PEG).

In embodiments, the neurotensin R1 agonist is a peptide neurotensin R1 agonist. In embodiments, the neurotensin R1 agonist is a blood-brain barrier penetrating agonist. In embodiments, the agonist is a pharmaceutically acceptable salt of PD 149163. In embodiments, the agonist is N2-[(2S)-2,6-Diaminohexyl]-L-lysyl-L-prolyl-L-tryptophyl-3-methyl-L-valyl-L-Leucine ethyl ester tetrahydrochloride hydrate. In embodiments, the agonist has the structure:

[chemical structure]

In embodiments, the agonist is in the form of:

[chemical structure with ·xH2O ·4HCl]

In embodiments, the neurotensin R1 agonist is NTS(8-13), (RRPYIL, SEQ ID NO:1). In embodiments, the agonist is the pseudopeptide KKPYIL (SEQ ID NO:2) (Modifications: Lys-1-Lys-2 peptide bond replaced with Ψ(CH$_2$—NH)). In embodiments, the neurotensin R1 agonist is not the 13-amino acid native neurotensin peptide.

In embodiments, the PEG is a low molecular weight. In embodiments, the PEG is a PEG400. In embodiments, the PEG is a PEG200.

In embodiments, the duration of action of the neurotensin R1 agonist within a subject in the presence of the amount of a polyethylene glycol polymer is longer than the duration of action of the same of amount of neurotensin R1 agonist in the presence of saline carrier in place of the polyethylene glycol polymer. In embodiments, the PEG is not conjugated to the agonist. In embodiments, the PEG is conjugated to the agonist. In embodiments, the PEG is an amount relative to the neurotensin R1 agonist sufficient to not induce drowsiness or not induce lethargy when the formulation is administered subcutaneously.

In embodiments, the neurotensin R1 agonist and, optionally, the PEG, is encapsulated in a liposome to control release. Liposomes are self-assembled (phospho)lipid-based drug vesicles that form a bilayer (uni-lamellar) and/or a concentric series of multiple bilayers (multilamellar) enclosing a central aqueous compartment. In embodiments, the size of liposomes ranges from 30 nm to the micrometer scale. In embodiments, the phospholipid bilayer is 4-5 nm thick. In embodiments, the liposome formulation containing the active ingredient (with or without PEG) is a suspension or is lyophilized. In embodiments, the liposomes are unilamellar vesicles (ULVs), oligolamellar vesicles (OLVs), multilamellar vesicles (MLVs), or multivesicular liposomes (MVLs). In embodiments, the liposomes are ULVs. In embodiments, the ULVs are small unilamellar vesicles (SUVs, 30-200 nm diameter). In embodiments, the ULVs are large unilamellar vesicles (LUVs, greater than 200 nm diameter, up to 500 nm). In embodiments, the liposomes are constructed from one or more of the following: fully hydrogenated soy phosphatidylcholine (HSPC), egg phosphatidylcholine (EPC), distearoylphosphatidylcholine (DSPC), dioleoyl phosphatidylcholine (DOPC), dierucoyl phosphatidylcholine (DEPC), palmitoyl-2-oleoyl-sn-glycero-3-phosphocholine (POPC), dipalmitoyl phosphatidylcholine (DPPC), dimyristoylphosphatidylcholine (DMPC), dipalmitoylphosphatidylglycerol (DPPG), distearoylphosphatidylglycerol (DSPG), dioleoyl phosphatidylserine (DOPS), dioleoylphosphatidylserine (OOPS), cholesterol (Chol), sphingomyelin (SM), N-(carbonyl-methoxypolyethlyeneglycol-2000)-distearolyphosphatidylethanolamine (MPEG-2000-DSPE).

A product is provided comprising a sub-cutaneous injector and the formulation described herein as a liquid formulation. In embodiments, the product is an auto-injector.

A method is provided of treating a symptom of an autism spectrum disorder in a subject comprising administering to the subject an amount of a neurotensin R1 agonist effective to treat a symptom of an autism spectrum disorder.

In embodiments, the symptom is a sensory symptom.

In embodiments, the neurotensin R1 agonist is a peptide neurotensin R1 agonist.

In embodiments, the amount of a neurotensin R1 peptide agonist is administered so as not to elicit drowsiness or so as not to elicit lethargy in the subject.

In embodiments, the amount of a neurotensin R1 peptide agonist is administered subcutaneously.

In embodiments, the subject has a SHANK3 haploinsufficiency or CNTNAP2 mutation. In embodiments, the subject has a FMRI mutation or a DLGAP2 mutation.

In embodiments, the neurotensin R1 agonist is administered as a formulation comprising:

a) an amount of a neurotensin R1 agonist effective to treat a symptom of an autism; and b) an amount of a polyethylene glycol polymer (PEG).

In embodiments, the methods further comprise diagnosing the subject is having an ASD prior to administration of the neurotensin R1 agonist. In embodiments, the ASD is diagnosed consistent with the criteria for Autism Spectrum Disorder in American Psychiatric Association's Diagnostic and Statistical Manual, Fifth Edition (DSM-5).

In embodiments, the methods further comprise identifying the subject as having a SHANK3 haploinsufficiency or a CNTNAP2 mutation prior to administering the amount of a neurotensin R1 agonist. In embodiments, the methods comprise further comprise identifying the subject as having an FMRI mutation or a DLGAP2 mutation prior to administering the amount of a neurotensin R1 agonist.

In embodiments, the sensory symptom is an olfactory symptom.

In embodiments, the subject has not been diagnosed with schizophrenia or does not have schizophrenia.

In embodiments, the subject has not been diagnosed with stroke or has not suffered a stroke.

In embodiments, the subject has not been diagnosed with cancer or does not have cancer.

In embodiments, the subject is human.

In embodiments, the subject is male.

"And/or" as used herein, for example with option A and/or option B, encompasses the separate embodiments of (i) option A, (ii) option B, and (iii) option A plus option B.

All combinations of the various elements described herein are within the scope of the invention unless otherwise indicated herein or otherwise clearly contradicted by context.

This invention will be better understood from the Experimental Details, which follow. However, one skilled in the art will readily appreciate that the specific methods and results discussed are merely illustrative of the invention as described more fully in the claims that follow thereafter.

Experimental Details

Herein is disclosed use of a neurotensin receptor agonist 1 for the treatment of the sensory issues in autism as well as formulations for such treatment. Neurotensin is a neuropeptide that is known to regulate blood pressure, body temperature, and feeding. It acts on Neurotensin receptor 1, which is a high affinity receptor to neurotensin and is expressed in certain groups of neurons that control sensory processing.

It was tested whether activation of these neurons would alleviate the sensory problems that mouse models of autism have with novel stimuli. PD149163 is a small peptide that crosses the blood brain barrier that selectively activate the neurotensin receptor 1 was chosen for experiments.

There are multiple genes that have been implicated in autism and each of these mutations produce a syndromic form of autism. These syndromic forms of autism are quite rare in humans. However, transgenic mice with the same gene mutations seen in humans are the current standard animal models used for studying autism. PD149163 was tested on two different mouse models of autism: 1) SHANK3 haploinsufficiency model which causes Phelan-McDermid syndrome in humans and 2) CNTNAP2 double knockout which causes Cortical Dysplasia Focal Epilepsy in humans. These two different models have construct validity (includes mutations that cause autism with high penetrance in humans) and face validity (the mice present with repetitive behaviors and other autism features). Success in treatment on two different models of autism indicates that the treatment would apply to humans and not be restricted to a small population of patients with a particular mutation.

In order to test the effect of NTSR1 agonists, a novel behavioral task was used developed in the lab. In this task (see FIG. 1), water-deprived, head-fixed mice were trained to identify target odors in the presence of background odors. If the mouse responded to the go target odors, it was rewarded with water. If the mouse wrongly responded to the no-go target odors, no water was delivered and it experienced a time out. Chance performance was 0.5 and optimal performance was 1. After mice mastered this task (performance>0.8) with a set of known background odors after ~10 days of training, the animals were tested with the same targets but in the presence of novel background odors. The performance of WT mice with novel background odors is above chance (0.74, 95% CI: 0.68-0.80, 3 WT mice).

Figures 2A, 2B:
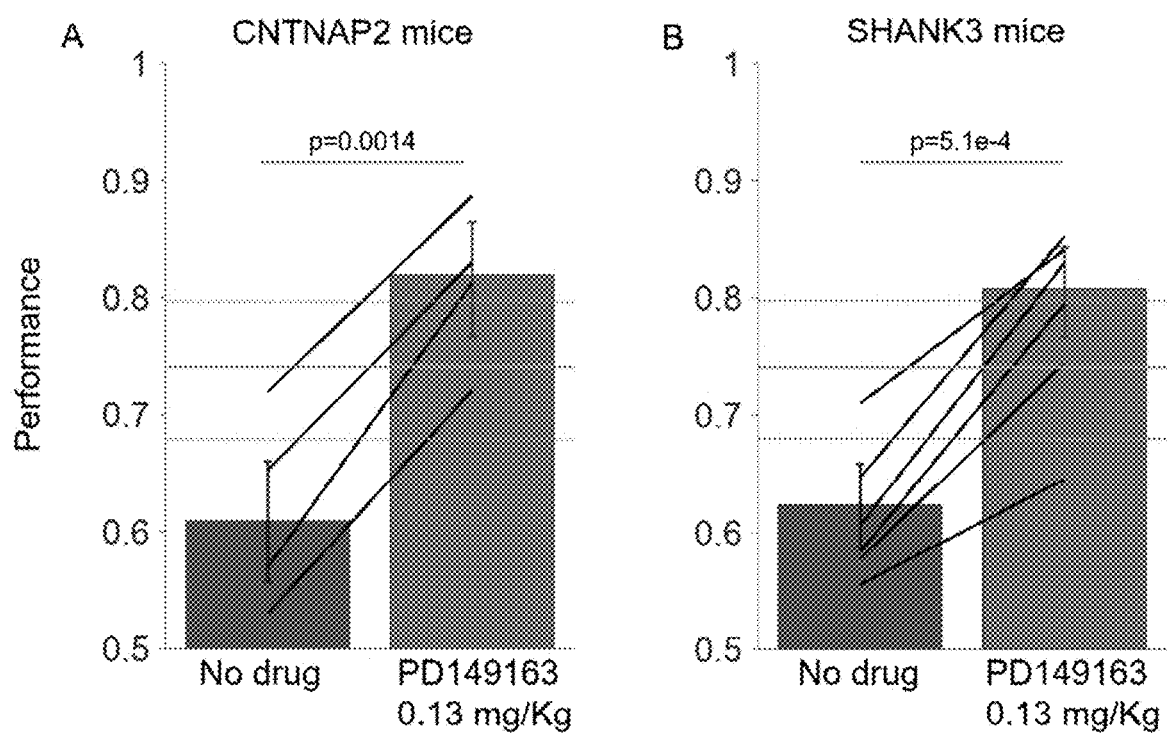
FIGS. 2A-2B: 2A. Performance of odor detection in novel environments for four CNTNAP2 knockout mice. The no-drug condition was measured on four testing sessions per animal. The drug condition was measured over two testing sessions per animal. Error bars are the 95% CI. Each line are the performances of each tested animal. Horizontal green lines are the mean and the 95% CI of the performance of 3 neurotypical mice. The p-value was calculated using a paired t-test for the performance of each animal (n=4 mice). 2B. Similar plot for six mice with SHANK3 haploinsufficiency.

This novel behavioral task was used to test the effects of the neurotensin receptor 1 agonists. The performances of both mouse models of autism without PD149163 (a peptide neurotensin receptor 1 agonist) were lower than the performance of the WT mice (SHANK3 haploinsufficiency: 0.62, 95% CI: 0.59-0.66, 6 mice, each mouse tested on 4 different days, CNTNAP2 knockout: 0.61, 95% CI: 0.56-0.65, 4 mice) (see FIG. 2). Animals were tested after subcutaneous injections of the PD149163 dissolved in saline solution at a concentration of 0.13 mg/per kilogram of mice, delivered 30 minutes prior to the onset of the behavioral test. This dosage reversed the recognition deficit in novel environments shown by both mouse models of autism, with performance that matched the performance of the WT mice (SHANK3 haploinsufficiency: 0.81, 95% CI: 0.77-0.85, 6 mice, each mouse tested on 2 different days, CNTNAP2 knockout: 0.82, 95% CI: 0.77-0.86, 4 mice). The drug effects lasted less than 24 hours and returned to baseline when animals were tested the next day.

Figure 3:
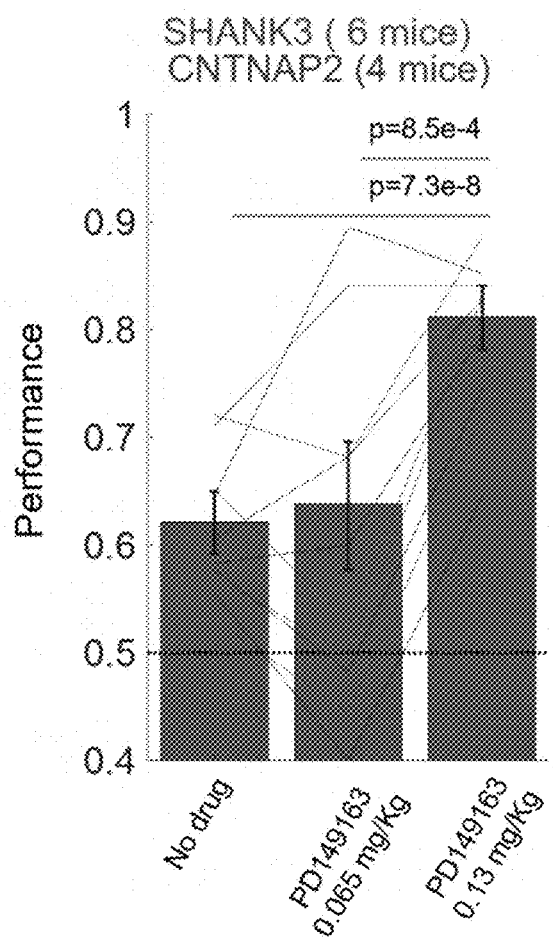
FIG. 3: Performance of odor detection in novel environments as a function of the dose of PD149163 injected subcutaneously using saline as vehicle. The bars represent the average performance for all 10 tested mice (four CNTNAP2 mice and six SHANK3 mice) at the three doses tested. The error bars are the 95% CI. The lines represent the performance for individual mice. The p values were calculated using paired t-test to compare the average performances of the 10 tested mice using the 0.13 mg/kg against the 0.065 mg/kg dose and the no drug condition.

The dosage and mode of delivery are very important factors for PD149163 to be an effective autism treatment and to reduce potential side effects that could limit the use of this treatment. A basic dose response curve was established: a subcutaneous half dose (0.065 mg/kg) using saline as a vehicle did not produce an improvement on the behavior (see FIG. 3). Doubling the dose (0.26 mg/kg) using saline as vehicle produced lethargy and the mice were not able to perform the behavior. Initial tests showed that delivering the therapeutic dose using the faster delivery of the intraperitoneal injection instead of the subcutaneous route resulted also in lethargy, indicating that slowing the absorption of PD149163 might broaden the therapeutic range, permitting the delivery of larger doses without producing lethargy.

Figure 4:
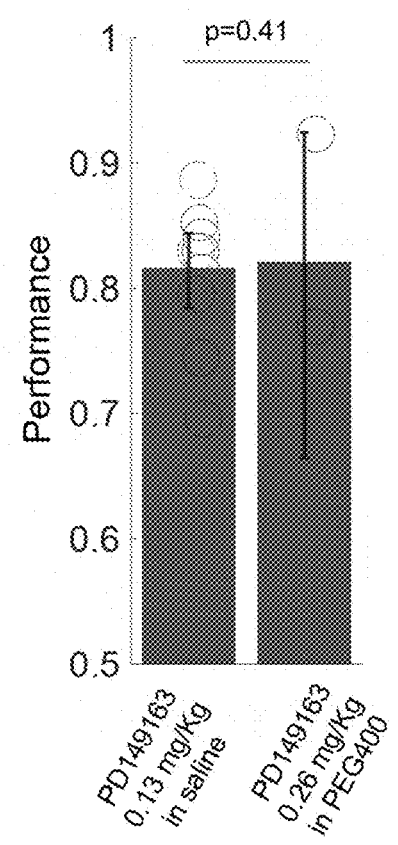
FIG. 4: Using PEG400 as vehicle permits to increase the dose of PD149163 without producing lethargy and keeping the improvement in behavioral performance. The performance of individual mice using saline as vehicle with PD149163 at concentration of 0.13 mg/kg is represented by circles (six SHANK3 mice in blue circles and four CNTNAP2 mice in red circles). The performance of two SHANK3 mice using PD149163 at a concentration of 0.26 mg/kg using PEG400 as vehicle. A t-test was used to compare the average performances of the 10 tested mice tested using saline as vehicle against the 2 mice tested using PEG400 as vehicle.

PD149163 was tested using polyethylene glycol 400 (PEG400) as vehicle instead of saline to reduce the absorption rate in two SHANK3 mice. A subcutaneous injection of PD149163 was given at 0.26 mg/Kg with PEG400 as vehicle. This dose of PD149163 resulted in lethargy when saline was used as vehicle but, when using PEG400 as vehicle (see FIG. 4), there was no lethargy and the SHANK3 mice (2 mice) performance was similar to the performance using saline at a concentration of 0.13 mg/Kg. Using PEG400 as vehicle widened the therapeutic range.

Figures 5A, 5B:
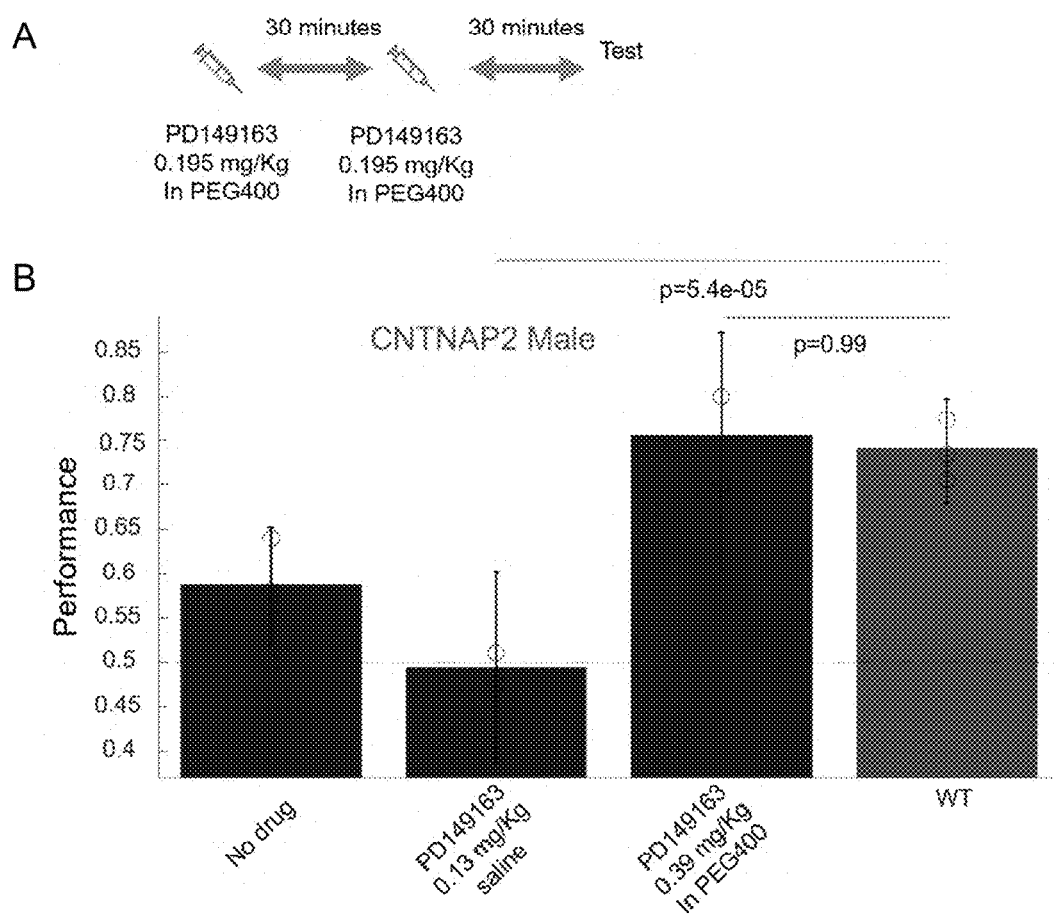
FIGS. 5A-5B: CNTNAP2 male mice required higher doses of PD14963 for performance rescue. 5A. To avoid the lethargy produced by this higher dose when it is dissolved using saline solution, PEG400 was used as vehicle (80 µg/ml). Also, the dosage was delivered in two separated subcutaneous injections. The first half of the dose (0.39 mg/kg) was given 1 hour before the onset of the behavioral task. The second half of the dose was given 30 minutes before the onset of the task. 5B. Performance of odor detection in novel environments for CNTNAP2 male mice for different dosages of PD149163 (blue bars) compared to the performance of WT mice (red bar). The error bars are the 95% CI. Circles represent the performance for individual mice. The p values were calculated using Fisher exact tests. There was no improvement with the dose of 0.13 mg/kg delivered using saline as vehicle. There was improvement when PD149163 was delivered using a higher dosage of 0.39 mg/Kg delivered using PEG400 as vehicle in two separated subcutaneous injections.

Further tested were 4 CNTNAP2 knockout male mice in the behavioral task (FIG. 5) They have a similar low performance with novel background odors as female CNTNAP2 knockout mice (4 CNTNAP2 knockout male mice, 8 sessions: 0.59, 95% CI: 0.52-0.65, n=223 trials). Odor recognition in novel environments was tested after subcutaneous injections of PD149163 dissolved in saline solution at a concentration of 0.13 mg/per kilogram, delivered 30 minutes prior to the onset of the behavioral test. Interestingly, although this dosage rescued the behavior in CNTNAP2 female mice and SHANK3 male and female mice, this dose did not rescue the behavior in CNTNAP2 knockout male mice (2 CNTNAP2 knockout male mice, 5 sessions with drug: 0.54, 95% CI: 0.44-0.65, n=86 trials). This performance was significantly worse than the performance of WT mice (p=5.4e-05, Fisher exact test).

In further experiments, the dose of PD149163 was increased to 0.39 mg/per kilogram of mice. To avoid the lethargy produced by this higher dose when it is dissolved using saline solution, PEG400 was used as vehicle (80 μg/ml). Also, the dosage was delivered in two separated subcutaneous injections. The first half of the dose was given 1 hour before the onset of the behavioral task. The second half of the dose was given 30 minutes before the onset of the task. This dosage composition and regime resulted in improved performance (2 CNTNAP2 knockout male mice, 2 sessions: 0.76, 95% CI: 0.60-0.87, n=45 trials). This performance was not significantly different from the performance of WT mice (p=0.99, Fisher exact test). It is apparent that slowing the absorption of PD149163, e.g., by using PEG400 as vehicle, as well as spacing the injections, permits the higher drug doses to achieve the therapeutic effect without causing side effects. This higher dose broadens the therapeutic range, which would be useful for treating a larger population of individuals with autism.

SEQUENCE LISTING

```
Sequence total quantity: 2
SEQ ID NO: 1            moltype = AA  length = 6
FEATURE                 Location/Qualifiers
source                  1..6
                        mol_type = protein
                        organism = synthetic construct
SEQUENCE: 1
RRPYIL                                                                    6

SEQ ID NO: 2            moltype = AA  length = 6
FEATURE                 Location/Qualifiers
source                  1..6
                        mol_type = protein
                        organism = synthetic construct
MOD_RES                 1..2
                        note = K1-K2 peptide bond replaced with Psi (CH2-NH)
SEQUENCE: 2
KKPYIL                                                                    6
```

What is claimed is:

1. A method of treating a symptom of an autism spectrum disorder in a subject comprising administering to the subject an amount of a neurotensin receptor 1 (R1) agonist effective to treat a symptom of an autism spectrum disorder;

wherein the neurotensin R1 agonist is a peptide neurotensin R1 agonist comprising the structure:

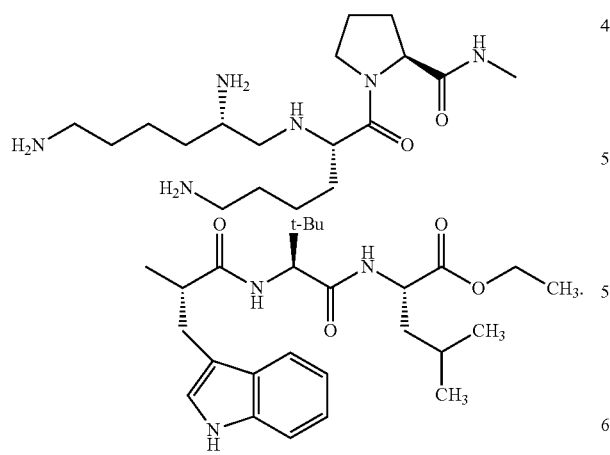

2. The method of claim 1, wherein the symptom is a sensory symptom.

3. The method of claim 2, wherein the sensory symptom is an olfactory symptom.

4. The method of claim 1, wherein the amount of a neurotensin R1 peptide agonist is administered so as not to elicit drowsiness or so as not to elicit lethargy in the subject.

5. The method of claim 1, wherein the amount of a neurotensin R1 peptide agonist is administered subcutaneously.

6. The method of claim 1, wherein the subject has a SHANK3 haploinsufficiency or CNTNAP2 mutation.

7. The method of claim 6, further comprising identifying the subject as having a SHANK3 haploinsufficiency or a CNTNAP2 mutation prior to administering the amount of a neurotensin R1 agonist.

8. The method of claim 1, wherein the subject has not been diagnosed with schizophrenia or does not have schizophrenia.

9. The method of claim 1, wherein the subject has not been diagnosed with stroke or has not suffered a stroke.

10. The method of claim 1, wherein the subject is human.

11. The method of claim 1, wherein the subject is male.

12. The method of claim 1, wherein the subject is female.

13. The method of claim 1, wherein neurotensin R1 agonist is administered as a formulation comprising:
a) an amount of a neurotensin R1 agonist effective to treat a symptom of an autism; and
b) an amount of a polyethylene glycol polymer.

14. The method of claim 1, wherein the administered neurotensin R1 agonist is encapsulated in liposomes.

* * * * *